United States Patent [19]
Sonetaka

[11] Patent Number: 5,666,380
[45] Date of Patent: Sep. 9, 1997

[54] DIGITAL COMMUNICATION SYSTEM AND METHOD OF COMPRESSING INFORMATION

[75] Inventor: Noriyoshi Sonetaka, Tokyo, Japan

[73] Assignee: NEC Corporation, Japan

[21] Appl. No.: 268,030

[22] Filed: Jun. 29, 1994

[30] Foreign Application Priority Data

Jun. 30, 1993 [JP] Japan ................................. 5-183347

[51] Int. Cl.$^6$ ................................................. H04B 1/66
[52] U.S. Cl. ...................... 375/240; 371/43.4; 371/43.6
[58] Field of Search ........................ 375/37, 94, 122; 371/43; 370/102, 118; 381/30

[56] References Cited

U.S. PATENT DOCUMENTS

| | | | |
|---|---|---|---|
| 4,462,101 | 7/1984 | Yasuda et al. | 371/43 |
| 5,117,427 | 5/1992 | Miyake et al. | 371/43 |

FOREIGN PATENT DOCUMENTS 637690  6/1988  Japan.

Primary Examiner—Shephen Chin
Assistant Examiner—T. Ghebretinsae
Attorney, Agent, or Firm—Ostrolenk, Faber, Gerb & Soffen, LLP

[57] ABSTRACT

A digital communication system and method, in which a convolutional coding of input data sequence Bm (m=1, 2, 3, ...) is carried out, and first coded data X1 of first coded data sequence Xm are deleted to output second coded data sequence Xn onto a transmission line. First receive data X1' are uniquely determined on the basis of receive data sequence Xn' transmitted via the transmission line, corresponding to the second coded data sequence Xn, and the last decoded data B0' of a data sequence which is previously received and decoded, to produce data sequence Xm' which are decoded by a maximum likelihood coding to obtain a decoded data sequence. Hence, a fixed amount of information of the data can be always compressed to transmit the compressed data even in a low line quality environment.

16 Claims, 6 Drawing Sheets

DIGITAL COMMUNICATION SYSTEM AND METHOD OF COMPRESSING INFORMATION

BACKGROUND OF THE INVENTION

The present invention relates to a digital communication system and a method using a combination of a convolutional coding and a maximum likelihood decoding for transmitting a certain amount of compressed information.

DESCRIPTION OF RELATED ARTS

Recently, with the digitizing of communication lines, the possibility of incorporating error correcting systems for improving communication quality into an actual system has been actively investigated. A combination of a convolutional coding and a maximum likelihood decoding is known as a very effective error correcting system. However, in a communication system with strict band constraints, from a viewpoint of effective use of bands, it is desirable to use an error correcting system having a large error correcting capability and a low redundancy of information transmission. One error correcting system developed to meet such demands is disclosed in U.S. Pat. No. 4,462,101.

FIG. 1 is a block diagram of this error correcting system using punctured codes. As shown in FIG. 1, on a transmit side, a coder is composed of a convolutional coding circuit 101 and a symbol deleting circuit 102. An input data sequence is coded to obtain a coded data sequence in the convolutional coding circuit 101 and the symbol deleting circuit 102 uniformly or uniquely deletes some symbols from the obtained coded data sequence in accordance with a deleting pattern to produce a transmission data sequence. This deleting pattern is stored in a deleting pattern holding circuit 103 where optimum deleting patterns corresponding to coding rates are stored.

The transmission data sequence is transmitted to a decoder on a receive side through a communication line. The decoder is composed of a dummy symbol inserter 104 and a maximum likelihood decoder 106. The dummy symbol inserter 104 inserts a dummy symbol into symbol deleted positions of a received data sequence corresponding to the transmission data sequence in accordance with an inserting pattern to obtain an inserted data sequence. The inserting pattern is stored in an inserting pattern holding circuit 105. Then, the maximum likelihood decoder 106 decodes the inserted data sequence to output a decoded data sequence, with the result in carrying out a usual maximum likelihood error correction.

In this conventional communication system, on a transmission path having limited bands, the coding rate is imaginarily restricted to a low level and the compressed information is sent out onto the transmission path. As a result, a high transmission efficiency can be attained.

However, in the conventional digital communication system described above, on the receive side, a dummy symbol is inserted into the positions of the symbols deleted on the transmit side and this insertion causes a degradation in the line quality of the transmission line. Hence, the communication is undesirable in such a low line quality environment.

SUMMARY OF THE INVENTION

It is therefore an object of the present invention to provide a digital communication system that overcomes the aforementioned problems of the prior art and is capable of always transmitting a certain amount of compressed information even in a low line quality environment.

It is another object of the present invention to provide a digital communication method capable of always transmitting a certain amount of compressed information even in a low line quality environment.

In accordance with one aspect of the present invention, there is provided a digital communication system, comprising: coding means for carrying out a convolutional coding of an input data sequence Bm (m=1, 2, 3, . . . ) to produce a first coded data sequence Xm; data compressing means for deleting first coded data X1 of the first coded data sequence Xm to produce a second coded data sequence Xn (n=2, 3, 4, . . . ), the first coded data X1 corresponding to first data B1 of the input data sequence Bm; transmitting means for transmitting the second coded data sequence Xn onto a transmission line; data expanding means for determining first receive data X1' on the basis of a receive data sequence Xn' transmitted via the transmission line and last decoded data of a data sequence which is previously received and decoded, to produce a data sequence Xm' using the first receive data X1', the receive data sequence Xn' corresponding to the second coded data sequence Xn; and maximum likelihood decoding means for decoding the data sequence Xm' using a maximum likelihood decoding to produce a decoded data sequence.

In accordance with another aspect of the present invention, there is provided a digital communication method, comprising the steps of: convolutional coding an input data sequence Bm (m=1, 2, 3, . . . ) to produce a first coded data sequence Xm; deleting first coded data X1 of the first coded data sequence Xm to produce a second coded data sequence Xn (n=2, 3, 4, . . . ), the first coded data X1 corresponding to first data B1 of the input data sequence Bm; transmitting the second coded data sequence Xn onto a transmission line; determining first receive data X1' on the basis of a receive data sequence Xn' transmitted through the transmitting step and last decoded data of a data sequence which is previously received and decoded, to produce a data sequence Xm' using the first receive data X1', the receive data sequence Xn' corresponding to the second coded data sequence Xn; and decoding the data sequence Xm' using a maximum likelihood decoding to produce a decoded data sequence.

Further, a digital transmission system of the present invention comprises coding means for carrying out a convolutional coding of an input data sequence Bm (m=1, 2, 3, . . . ) to produce a first coded data sequence Xm; data compressing means for deleting first coded data X1 of the first coded data sequence Xm to produce a second coded data sequence Xn (n=2, 3, 4, . . . ), the first coded data X1 corresponding to first data B1 of the input data sequence Bm; and transmitting means for transmitting the second coded data sequence Xn onto a transmission line.

The coding means can code the data sequence Bm at a coding rate of 1/2 to produce the first coded data sequence Xm.

The coding means can carry out the convolutional coding of the input data sequence Bm (Bm=either 0 or 1; m=1, 2, 3, . . . ) to produce a third coded data sequence PmQm (Pm=either 0 or 1; Qm=either 0 or 1), and the data compressing means can delete first coded data P1Q1 of the coded data sequence PmQm to produce a fourth coded data sequence PnQn (n=2, 3, 4, . . . ), the first coded data P1Q1 corresponding to the first data B1 of the input data sequence Bm. The data expanding means can determine first receive data P1'Q1' on the basis of a receive data sequence Pn'Qn' transmitted via the transmission line and last decoded data B0' of a data sequence which is previously received and decoded, to produce a data sequence Pm'Qm' using the first receive data P1'Q1', the receive data sequence Pn'Qn' corresponding to the fourth coded data sequence PnQn and the maximum likelihood decoding means can decode the data sequence Pm'Qm' using the maximum likelihood decoding to produce the decoded data sequence.

The coding means can include a plurality of shift registers and a plurality of exclusive logical adders for calculating an exclusive logical sum of bit outputs of the shift registers and calculating an exclusive logical sum of bit outputs of first and third shift registers.

The transmitting means can include parallel-serial converter means for multiplexing the second coded data sequence Xn compressed by the data compressing means to output a transmit data sequence.

The data expanding means can include means for producing the data sequence Xm' on the basis of a trellis code, and the maximum likelihood decoding means can include an addition comparison selection circuit which inputs the data sequence Xm' produced by the data expanding means and selects paths by a Viterbi coding; a path memory circuit for storing remained paths output from the addition comparison selection circuit; and a maximum likelihood discrimination circuit for determining a decoded output from the remained paths.

According to the present invention, a fixed amount of data compression can be always carried out on a transmit side by deleting head coded data from a convolutional coded data sequence Xm and a receive data sequence Xn' can be uniquely expanded and reproduced on a receive side, as apparent from a trellis expression.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
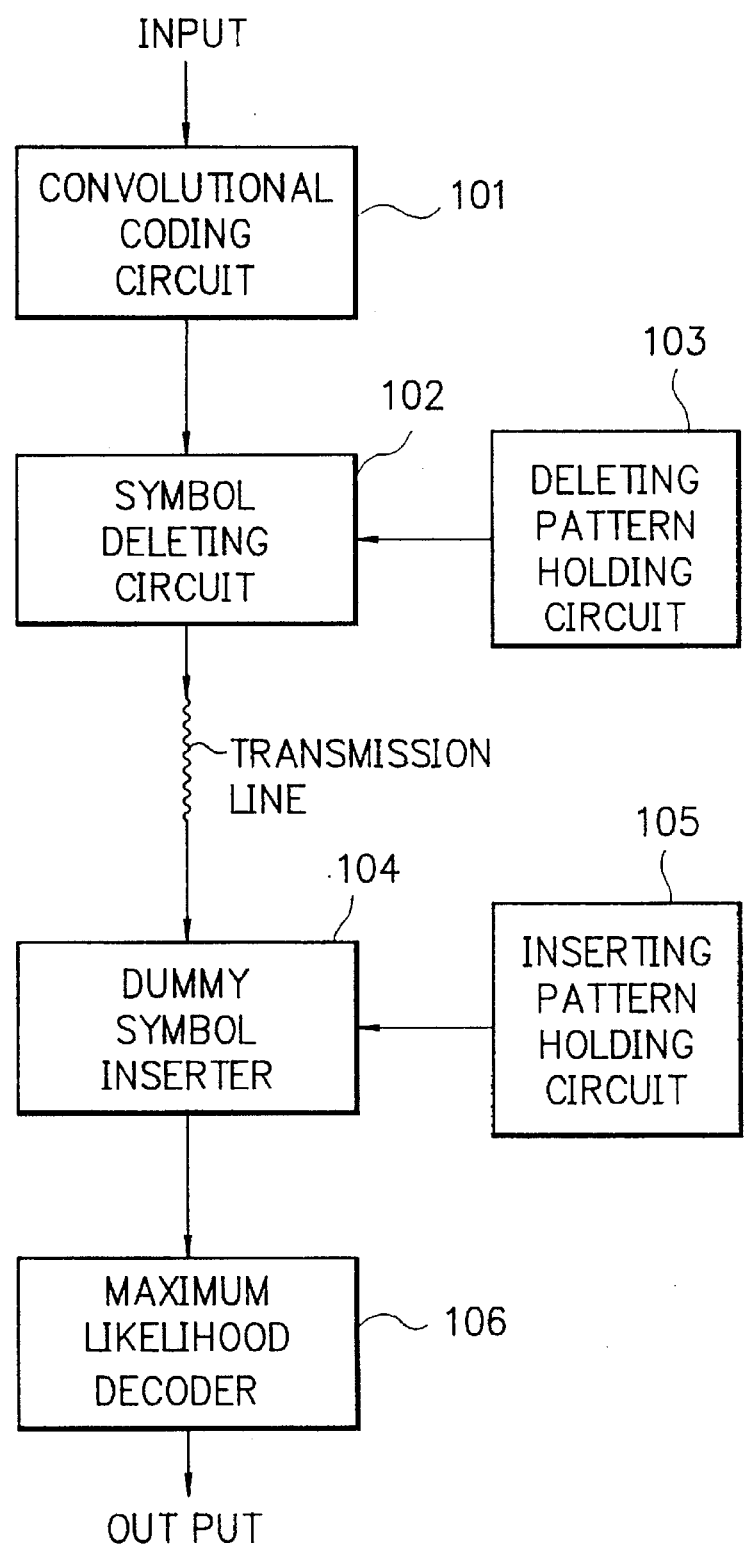
FIG. 1 is block diagram of a conventional digital communication system.
Figure 2:
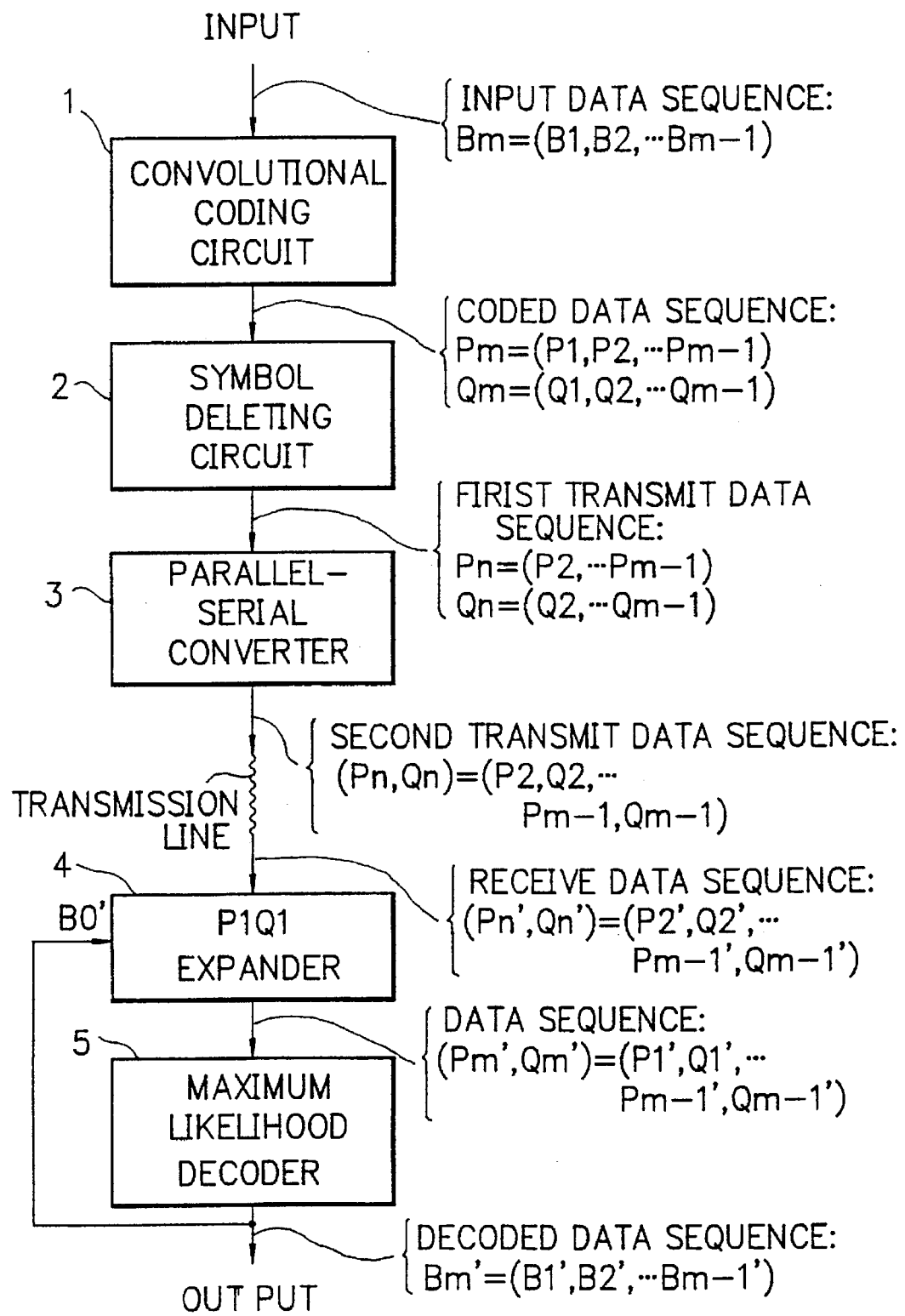
FIG. 2 is a block diagram of one embodiment of a digital communication system according to the present invention.

Referring now to the drawings, wherein like reference characters designate like or corresponding parts throughout the views and thus the repeated description thereof can be omitted for brevity, there is shown in FIG. 2 one embodiment of a digital communication system according to the present invention. In this case, it is assumed that a constraint length K of a convolutional code is 3 and a coding rate R is 1/2.

Transmit Side

A convolutional coding circuit 1 inputs a data sequence Bm and carries out a convolutional coding of the input data sequence Bm to output coded data sequences Pm and Qm. To take a first input bit B1 as an instance, two coded bits P1 and Q1 against one input bit B1 are produced.

Next, the coded data sequences Pm and Qm are input to a symbol deleting circuit 2 and the symbol deleting circuit 2 deletes first coded bits P1 and Q1 to produce first transmit data sequences Pn and Qn. In other words, the symbol deleting circuit 2 executes an information compression of two bits of the coded data sequences Pm and Qm.

The obtained first transmit data sequences Pn and Qn are multiplexed by a parallel-serial converter 3 to output a second transmit data sequence (Pn, Qn) onto a transmission line.

Receive Side

A receive data sequence (Pn', Qn') is input to a P1Q1 expander 4 via the transmission line and the P1Q1 expander 4 uniformly or uniquely determines the deleted data (P1', Q1') using the last decoded data B0' of the data sequence received just before receiving the present receive data sequence (Pn', Qn') and the head data (P2', Q2') of the present receive data sequence (Pn', Qn'). The receive data sequence (Pn', Qn') is expanded using the determined data (P1', Q1') to produce a data sequence (Pm', Qm').

The obtained data sequence (Pm', Qm') is input to a maximum likelihood decoder 5 and the maximum likelihood decoder 5 decodes the input data sequence (Pm', Qm') using a Viterbi algorithm to output a decoded data sequence Bm'.

Figure 3:
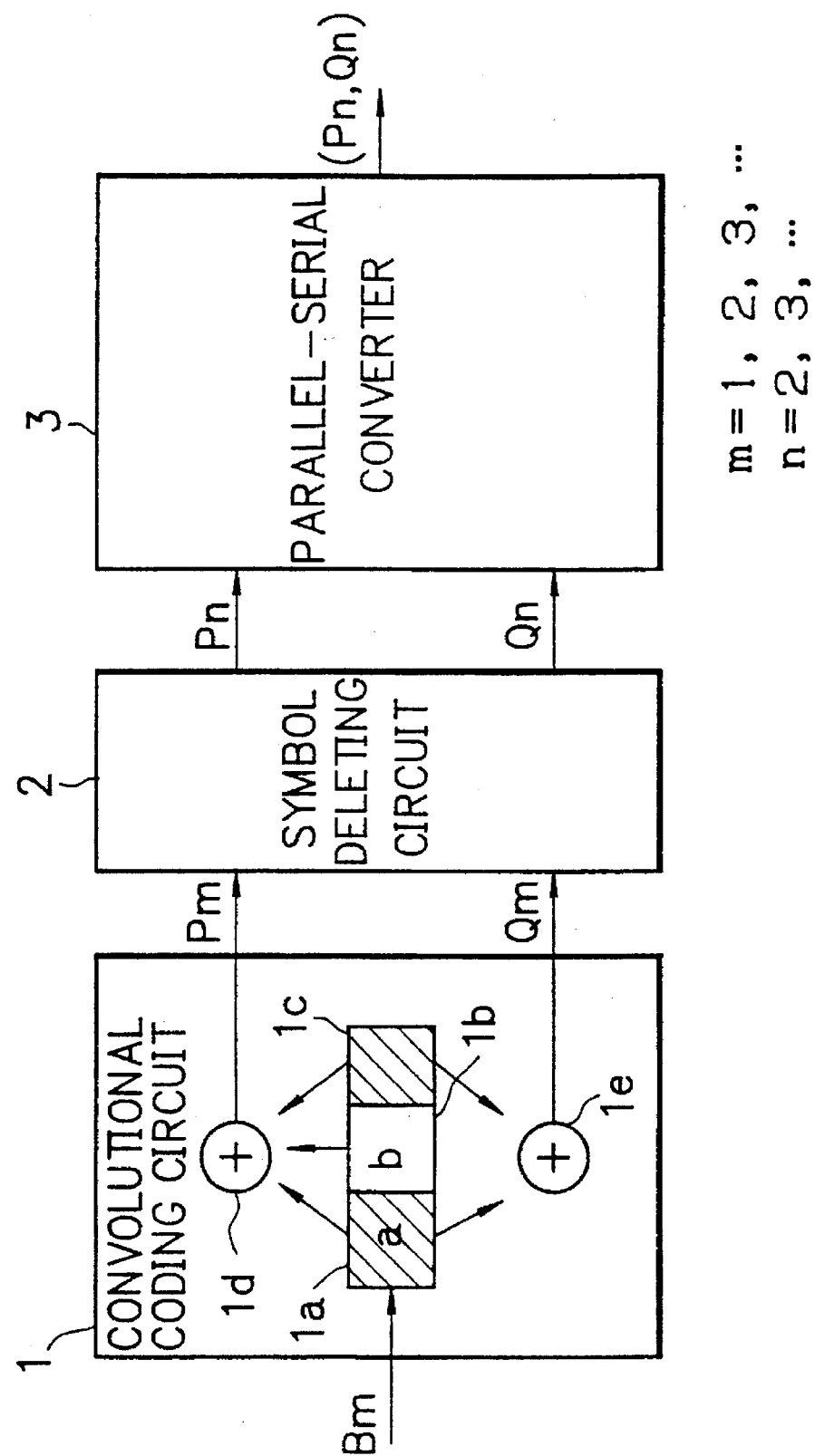
FIG. 3 is a block diagram of a construction of a transmit side of the digital communication system shown in FIG. 2.

FIG. 3 shows the construction of the transmit side of the digital communication system shown in FIG. 2.

In FIG. 3, the convolutional coding circuit 1 includes three stages of first, second and third shift registers 1a, 1b and 1c corresponding to the constraint length K=3 and two EXORs (exclusive logical adders) 1d and 1e for calculating an exclusive OR of the bit outputs of the first, second and third shift registers 1a, 1b and 1c and calculating an exclusive OR of the bit outputs of the first and third shift registers 1a and 1c. In this convolutional coding circuit 1, the state transition as the coder is determined and hence a path available in a trellis expression can be decided.

The coded data sequences Pm and Qm (m=1, 2, 3, ...) output from the respective EXORs 1d and 1e of the convolutional coding circuit 1 are fed to the symbol deleting circuit 2 and the symbol deleting circuit 2 deletes the first coded bits P1 and Q1 to produce the first transmit data sequences Pn and Qn (n=2, 3, 4, ...). This compressed first transmit data sequences Pn and Qn are multiplexed in the parallel-serial converter 3 to output the second transmit data sequence (Pn, Qn) onto the transmission line.

Figure 4:
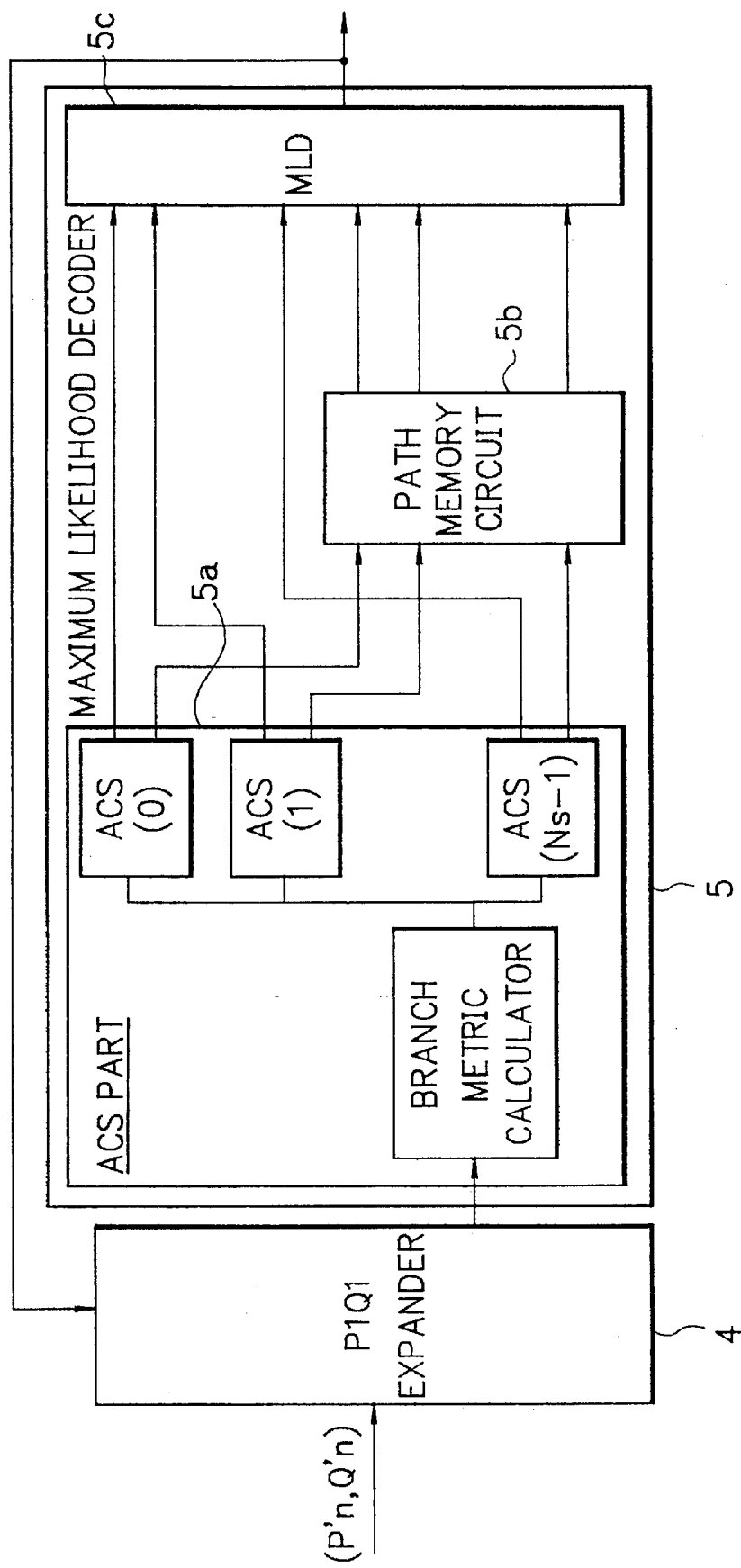
FIG. 4 is a block diagram of a construction of a receive part of the digital communication system shown in FIG. 2.

FIG. 4 shows the construction of the receive side of the digital communication system shown in FIG. 2.

In FIG. 4, the P1Q1 expander 4 carried out the information expanding of the receive data sequence (Pn', Qn'), as described above, and the obtained expanded data sequence (Pm', Qm') is input to the maximum likelihood decoder 5.

In the maximum likelihood decoder 5, an addition comparison selection (ACS) part 5a including a branch metric calculator, an ACS (0), an ACS (1) and an ACS (Ns-1) calculates metrics of paths, and a path memory circuit 5b renews the remaining paths, and an MLD (maximum likelihood discriminator) 5c determines the decoded output from the remaining paths.

Next, the operation of the system shown in FIGS. 3 and 4 will now be described in detail when a data sequence Bm =(0, 1, 0, 0) is given. In this case, it is assumed that the bit initial values of all the stages of the shift register 1a in the convolutional coding circuit 1 are zero.

Figure 5:
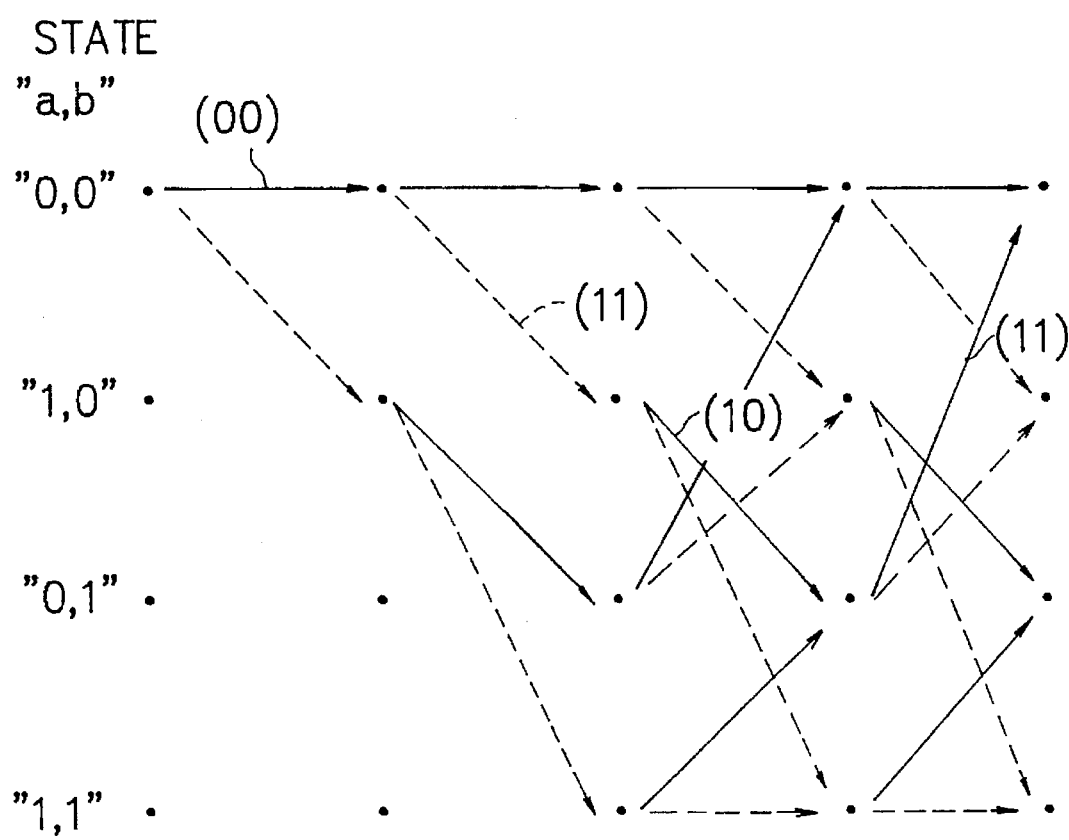
FIG. 5 is a schematic view showing a trellis expression of convolutional codes used in the digital communication system shown in FIG. 2.

FIG. 5 shows a trellis expression of a convolutional code. In this case, when the input data bit is "0", the state moves, as indicated by solid arrows and, when the input data is "1", the state moves in a manner shown by the broken arrows.

No matter which bit sequence is the input data sequence Bm, the coded data sequence corresponding to one of the paths within the trellis shown in FIG. 5 is output from the convolutional coding circuit 1. In this embodiment, since the input data sequence Bm is (0, 1, 0, 0), the coded data sequences Pm, Qm turn out 00, 11, 10, 11. The first coded data P1, Q1=00 of the coded data sequences Pm, Qm are deleted in the symbol deleting circuit 2 and hence the first transmit data sequences Pn, Qn=11, 10, 11 are obtained.

In the P1Q1 expander 4 on the receive side, as apparent from the trellis expression shown in FIG. 5, the deleted data (P1', Q1') can be uniformly determined from the head data (P2', Q2') of the present receive data sequence (Pn', Qn') and the last decoded data B0' of the data sequence received just before receiving the present receive data sequence (Pn', Qn'). That is, when the path reaching up to the last data of the preceding data sequence is decided and the present receive data (P2', Q2') are given, it is readily understood from the trellis expression that the path to be followed to the last data can be uniquely determined.

Figure 6:
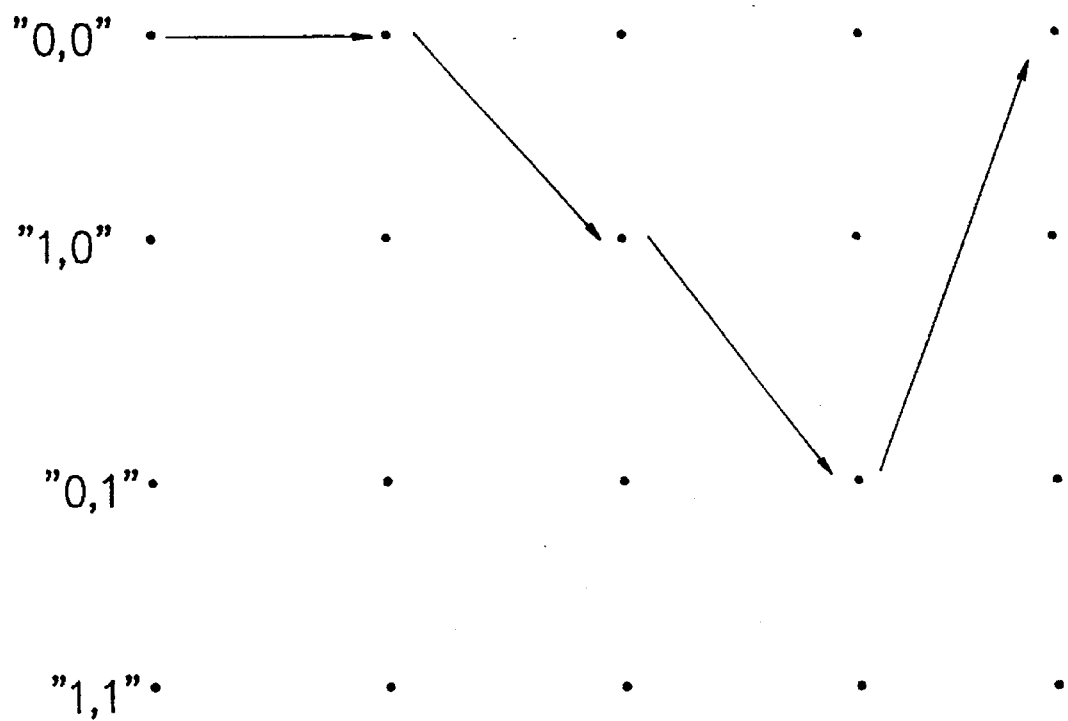
FIG. 6 is a schematic view showing a path of a trellis expression selected by a Viterbi decoding according to the present invention.

Thus the expanded data sequence (Pm', Qm') is input to the maximum likelihood decoder 5 and the path shown in FIG. 6 is selected by the Viterbi decoding. As a result, the decoded data sequence Bm' is obtained.

As described above, in the digital communication system and method according to the present invention, by deleting head coded data from a convolutional coded data sequence Xm, a fixed amount of data compression can be always carried out on a transmit side and a receive data sequence Xn' can be uniquely expanded and reproduced on a receive side, as clearly understood from a trellis expression. Hence, even when there is a strict restriction in a band of a transmission line or in a low line quality environment, a large amount of data can be effectively transmitted with a high error correcting capability.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A digital transmission system, comprising:

coding means for carrying out a convolutional coding of an input data sequence Bm (m=1, 2, 3, . . . ) to produce a first coded data sequence Xm;

data compressing means for deleting first coded data X1 of the first coded data sequence Xm irrespective of a coding ratio in the convolutional coding to produce a second coded data sequence Xn (n=2, 3, 4, . . . ), the first coded data X1 corresponding to first data B1 of the input data sequence Bm; and transmitting means for transmitting the second coded data sequence Xn onto a transmission line.

2. The digital transmission system as claimed in claim 1, wherein the coding means codes the data sequence Bm at a coding rate of 1/2 to produce the first coded data sequence Xm.

3. The digital transmission system as claimed in claim 1, wherein the coding means carries out the convolutional coding of the input data sequence Bm (Bm=either 0 or 1; m=1, 2, 3, . . . ) to produce a third coded data sequence PmQm (Pm=either 0 or 1; Qm=either 0 or 1), and the data compressing means deletes first coded data P1Q1 of the third coded data sequence PmQm to produce a fourth coded data sequence PnQn (n=2, 3, 4, . . . ), the first coded data P1Q1 corresponding to the first data B1 of the input data sequence Bm.

4. The digital transmission system as claimed in claim 3, wherein the coding means includes a plurality of shift registers and a plurality of exclusive logical adders for calculating an exclusive logical sum of bit outputs of the shift registers and calculating an exclusive logical sum of bit outputs of first and third shift registers.

5. The digital transmission system as claimed in claim 4, wherein the transmitting means includes parallel-serial converter means for multiplexing the second coded data sequence Xn to output a transmit data sequence.

6. A digital communication system, comprising:

coding means for carrying out a convolutional coding of an input data sequence Bm (m=1, 2, 3, . . . ) to produce a first coded data sequence Xm;

data compressing means for deleting first coded data X1 of the first coded data sequence Xm to produce a second coded data sequence Xn (n=2, 3, 4, . . . ), the first coded data X1 corresponding to first data B1 of the input data sequence Bm;

transmitting means for transmitting the second coded data sequence Xn onto a transmission line;

data expanding means for determining first receive data X1' on the basis of a receive data sequence Xn' transmitted via the transmission line and last decoded data B0' of a data sequence which is previously received and decoded, to produce a data sequence Xm' using the first receive data X1', the receive data sequence Xn' corresponding to the second coded data sequence Xn; and maximum likelihood decoding means for decoding the data sequence Xm' using a maximum likelihood decoding to produce a decoded data sequence.

7. The digital communication system as claimed in claim 6, wherein the coding means codes the data sequence Bm at a coding rate of 1/2 to produce the first coded data sequence Xm.

8. The digital communication system as claimed in claim 6, wherein the coding means carries out the convolutional coding of the input data sequence Bm (Bm=either 0 or 1; m=1, 2, 3, . . . ) to produce a third coded data sequence PmQm (Pm=either 0 or 1; Qm=either 0 or 1), and the data compressing means deletes first coded data P1Q1 of the third coded data sequence PmQm to produce a fourth coded data sequence PnQn (n=2, 3, 4, . . . ), the first coded data P1Q1 corresponding to the first data B1 of the input data sequence Bm, and wherein the data expanding means determines first receive data P1'Q1' on the basis of a receive data sequence Pn'Qn' transmitted via the transmission line and last decoded data B0' of a data sequence which is previously received and decoded, to produce a data sequence Pm'Qm' using the first receive data P1'Q1', the receive data sequence Pn'Qn' corresponding to the fourth coded data sequence PnQn and the maximum likelihood decoding means decodes the data sequence Pm'Qm' using the maximum likelihood decoding to produce the decoded data sequence.

9. The digital communication system as claimed in claim 6, wherein the coding means includes a plurality of shift registers and a plurality of exclusive logical adders for calculating an exclusive logical sum of bit outputs of the shift registers and calculating an exclusive logical sum of bit outputs of first and third shift registers.

10. The digital communication system as claimed in claim 6, wherein the transmitting means includes parallel-serial converter means for multiplexing the second coded data sequence Xn compressed by the data compressing means to output a transmit data sequence.

11. The digital communication system as claimed in claim 6, wherein the data expanding means includes means for producing the data sequence Xm' on the basis of a trellis code, and the maximum likelihood decoding means includes:.

an addition comparison selection circuit which inputs the data sequence Xm' produced by the data expanding means and selects paths by a Viterbi coding;

a path memory circuit for storing remained paths output from the addition comparison selection circuit; and a maximum likelihood discrimination circuit for determining a decoded output from the remained paths.

12. A digital communication method, comprising:

a coding step for carrying out a convolutional coding of an input data sequence Bm (m=1, 2, 3, ...) to produce a first coded data sequence Xm;

a data compressing step for deleting first coded data X1 of the first coded data sequence Xm to produce a second coded data sequence Xn (n=2, 3, 4, ...), the first coded data X1 corresponding to first data B1 of the input data sequence Bm;

a transmitting step for transmitting the second coded data sequence Xn onto a transmission line;

a data expanding step for determining first receive data X1' on the basis of a receive data sequence Xn' transmitted through the transmitting step and last decoded data B0' of a data sequence which is previously received and decoded, to produce a data sequence Xm' using the first receive data X1', the receive data sequence Xn' corresponding to the second coded data sequence Xn; and a maximum likelihood decoding step for decoding the data sequence Xm' using a maximum likelihood decoding to produce a decoded data sequence.

13. The digital communication method as claimed in claim 12, wherein the coding step codes the data sequence Bm at a coding rate of 1/2 to produce the first coded data sequence Xm.

14. The digital communication method as claimed in claim 12, wherein the coding step carries out the convolutional coding of the input data sequence Bm (Bm=either 0 or 1; m=1, 2, 3, ...) to produce a third coded data sequence PmQm (Pm=either 0 or 1; Qm=either 0 or 1), and the data compressing step deletes first coded data P1Q1 of the third coded data sequence PmQm to produce a fourth coded data sequence PnQn (n=2, 3, 4, ...), the first coded data P1Q1 corresponding to the first data B1 of the input data sequence Bm, and wherein the data expanding step determines first receive data P1'Q1' on the basis of a receive data sequence Pn'Qn' transmitted through the transmitting step and last decoded data B0' of a data sequence which is previously received and decoded, to produce a data sequence Pm'Qm' using the first receive data P1'Q1', the receive data sequence Pn'Qn' corresponding to the fourth coded data sequence PnQn and the maximum likelihood decoding step decodes the data sequence Pm'Qm' using the maximum likelihood decoding to produce the decoded data sequence.

15. The digital communication method as claimed in claim 12, wherein the transmitting step includes a parallel-serial converting step for multiplexing the second coded data sequence Xn compressed in the data compressing step to output a transmit data sequence.

16. The digital communication method as claimed in claim 12, wherein the data expanding step includes a step for producing the data sequence Xm' on the basis of a trellis code, and the maximum likelihood decoding step includes:

an addition comparison selection step which inputs the data sequence Xm' produced in the data expanding step and selects paths by a Viterbi coding;

a path memory step for storing remained paths output from the addition comparison selection step; and a maximum likelihood discrimination step for determining a decoded output from the remained paths.

* * * * *